Oct. 25, 1932.  R. S. PULLEN ET AL  1,884,215
MATCH PACKAGE AND STAPLING INSERT
Filed Feb. 21, 1930  8 Sheets-Sheet 1
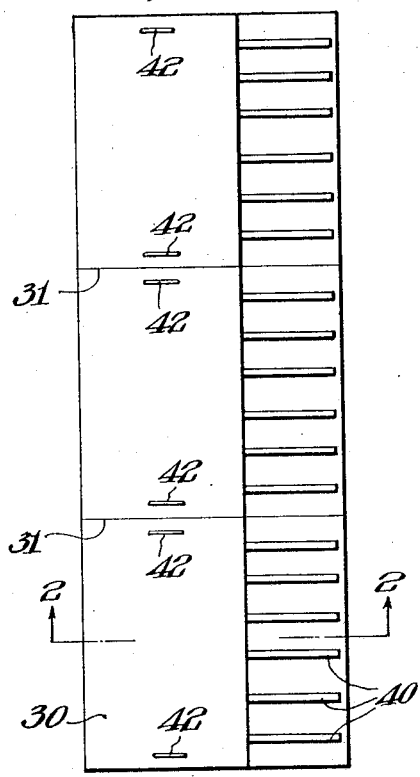
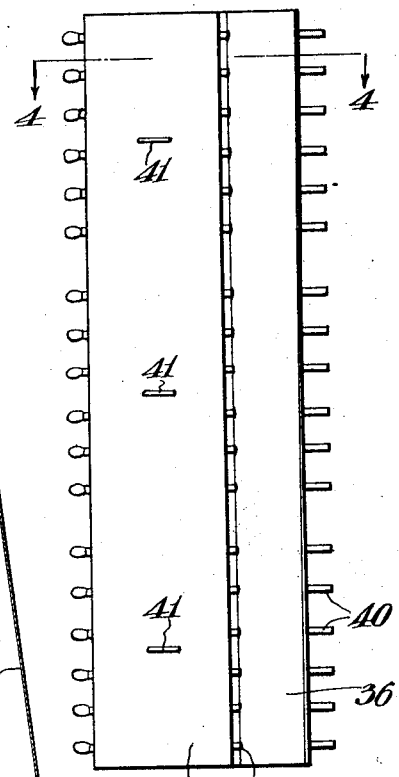
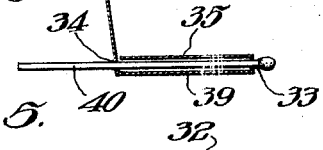
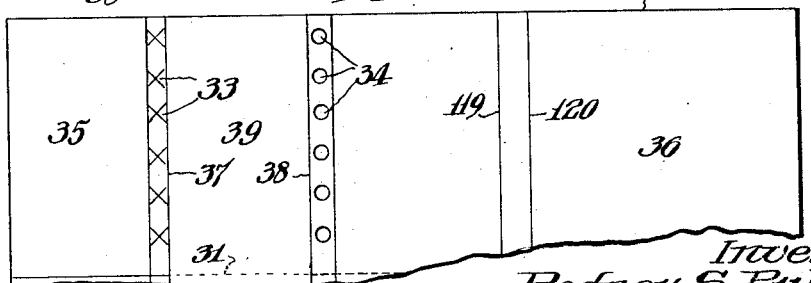
Inventors
Rodney S. Pullen, and
William J. Crowell, Jr.,
By
Wm Steell Jackson
Attorney.

Oct. 25, 1932.          R. S. PULLEN ET AL          1,884,215
                MATCH PACKAGE AND STAPLING INSERT
                  Filed Feb. 21, 1930        8 Sheets-Sheet 2

Inventors
Rodney S.Pullen and
William J.Crowell,Jr.,
by
Attorney

Oct. 25, 1932.    R. S. PULLEN ET AL    1,884,215
MATCH PACKAGE AND STAPLING INSERT
Filed Feb. 21, 1930    8 Sheets-Sheet 4

Inventors
Rodney S. Pullen, and
William J. Crowell, Jr.,
By
Attorney.

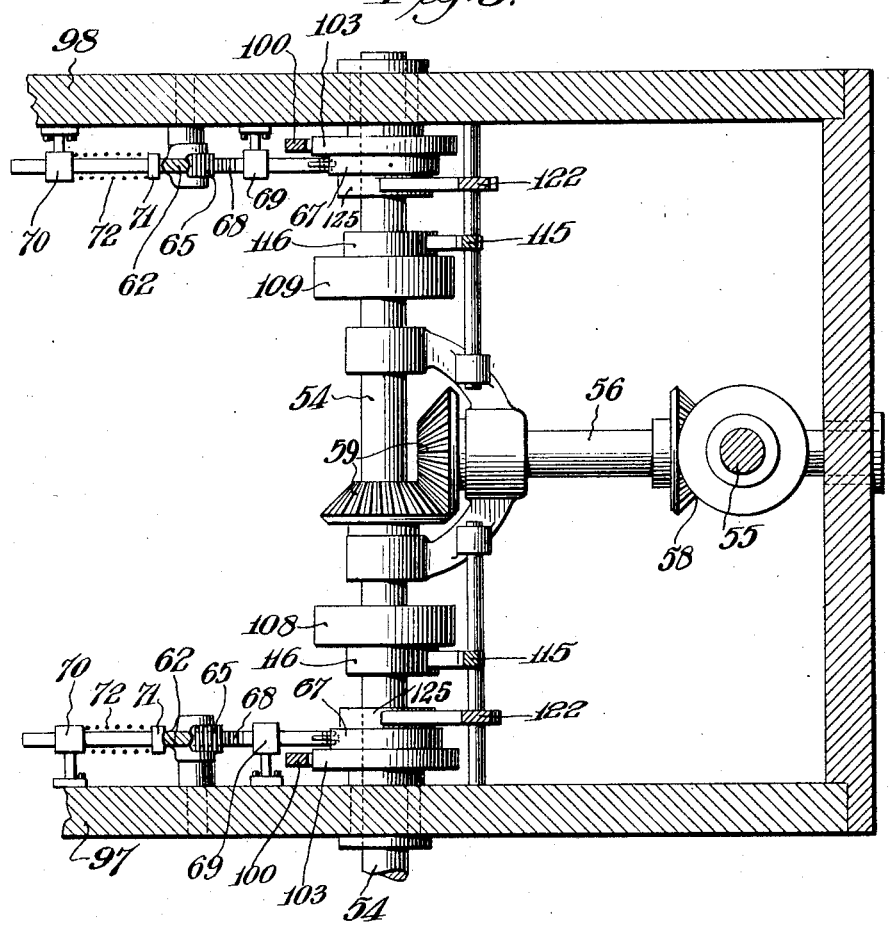
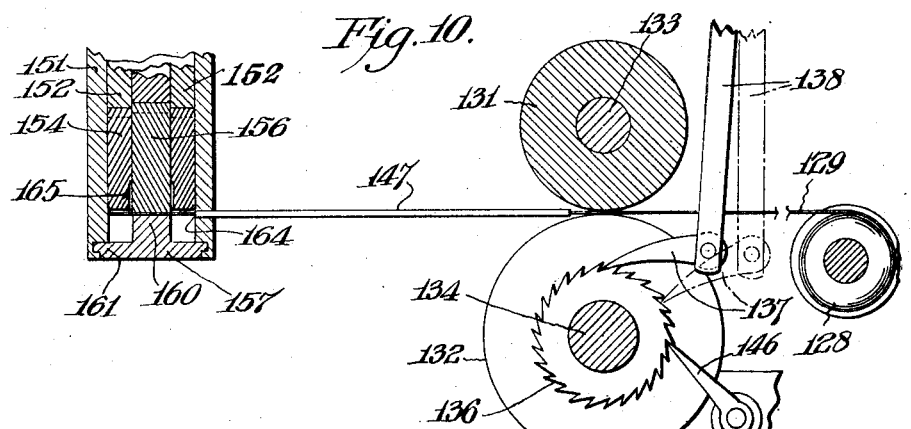

Oct. 25, 1932. R. S. PULLEN ET AL 1,884,215
MATCH PACKAGE AND STAPLING INSERT
Filed Feb. 21, 1930   8 Sheets-Sheet 6
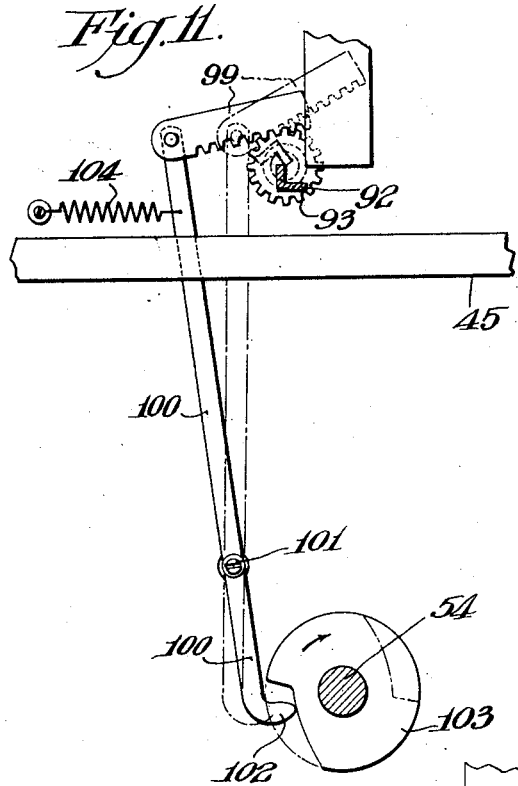
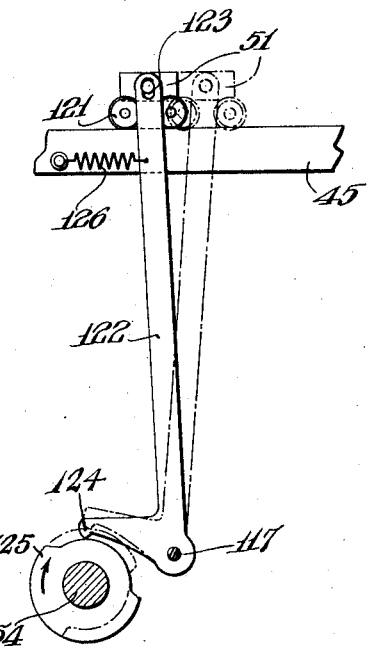
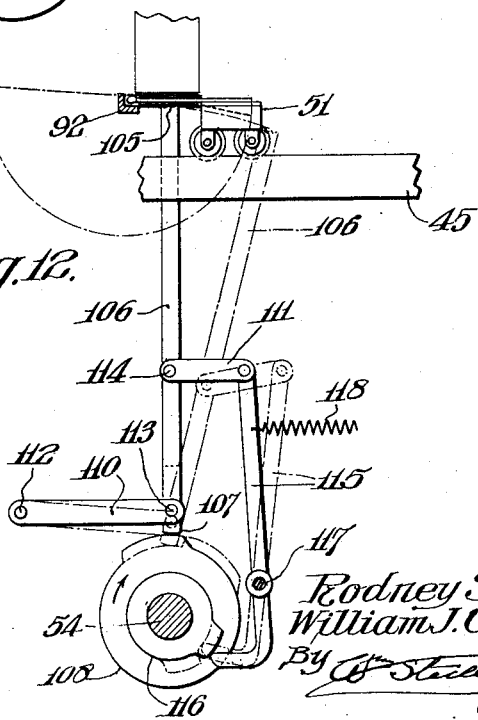
Inventors
Rodney S. Pullen, and
William J. Crowell, Jr.,
Attorney.

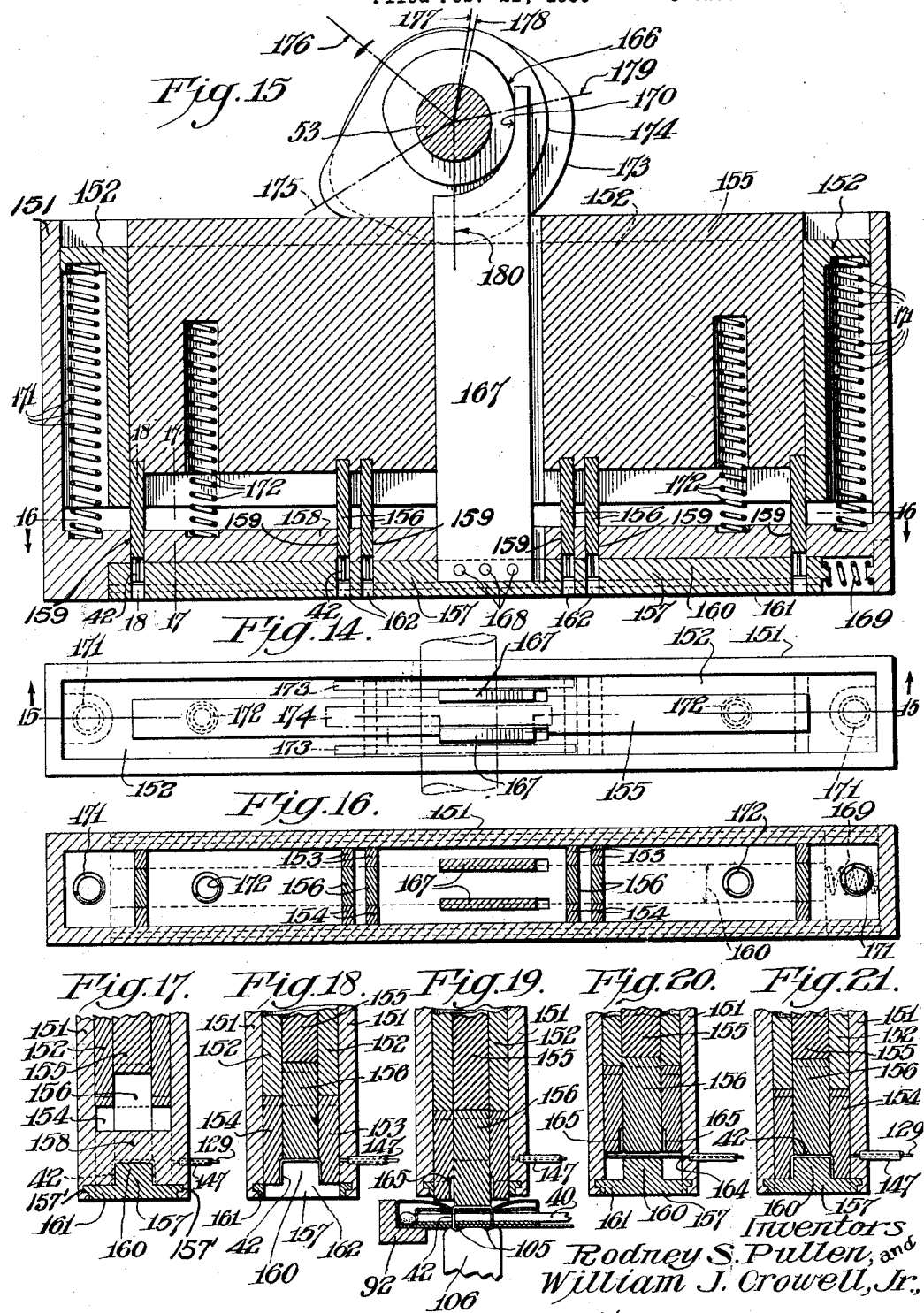

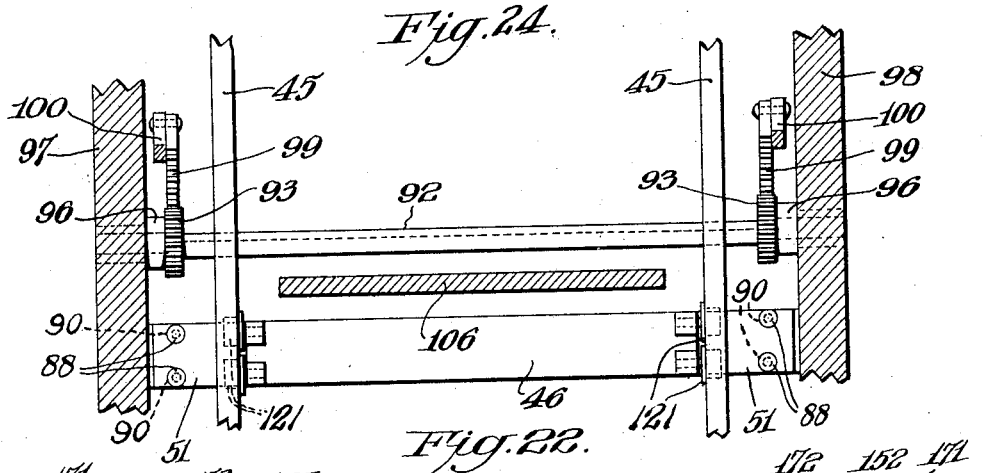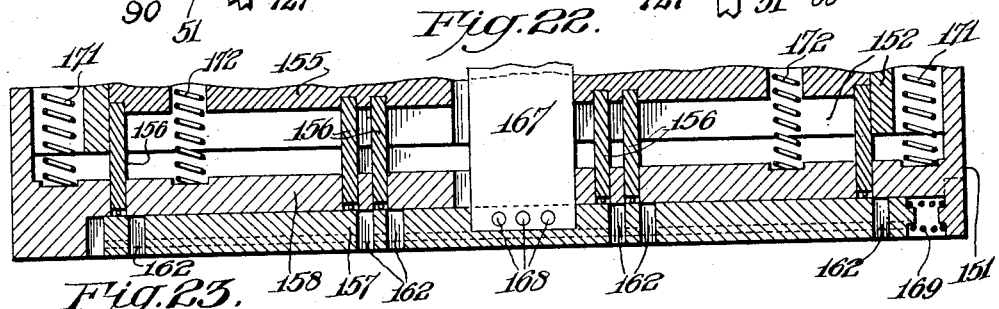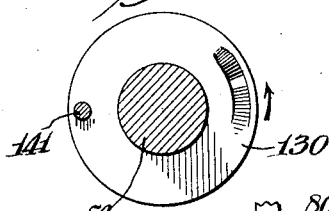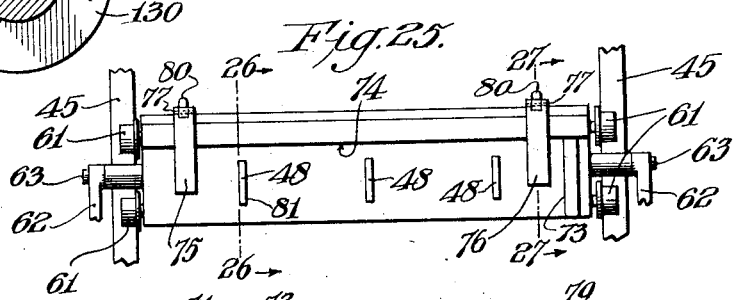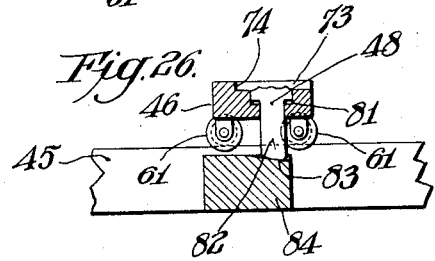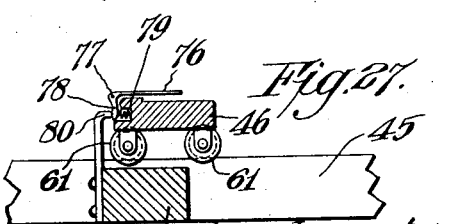

Patented Oct. 25, 1932

1,884,215

UNITED STATES PATENT OFFICE

RODNEY S. PULLEN, OF PHILADELPHIA, AND WILLIAM J. CROWELL, JR., OF WYNCOTE, PENNSYLVANIA, ASSIGNORS TO PULLENLITE COMPANY, OF PHILADELPHIA, PENNSYLVANIA, A CORPORATION OF PENNSYLVANIA

MATCH PACKAGE AND STAPLING INSERT

Application filed February 21, 1930. Serial No. 430,217.

Our invention relates to mechanism for packeting matches with particular reference to stapling mechanism, the invention having perhaps its widest application for the insertion of staples in single or multiple section match packets of the kind having matches threading spaced rows of perforations of a wrap.

In this type of match packet usually a short flap adjacent one row of perforations folds down against the exposed match portions intermediate the threaded rows, being preferably stapled to the wrap portion upon the other side of the matches intermediate the perforations while a long flap adjacent the other row of perforations folds down over the short flap, thence around the projecting match heads and up against the portion of the wrap intermediate the perforations, with the outside edges of each packet or packet section being preferably stapled through the thickness of the packet.

A purpose of our invention is to provide novel mechanism of the character indicated that is easy and inexpensive to manufacture and that will well meet the needs of service.

A further purpose is to combine short flap stapling mechanism with a packet carriage adapted to deliver the stapled packet to mechanism for folding and stapling the long flap of the packet.

A further purpose is to combine a long flap turn-over mechanism with a new and desirable stapling mechanism.

Further purposes will appear in the specification and in the claims.

We have elected to illustrate one only of the many forms of our invention, selecting a form that is practical and efficient in operation and which well illustrates the principles involved.

Figure 1 is a top plan view of a match packet of a type desirably manufactured by mechanism embodying one form of our invention, the lateral distance between individual matches being exaggerated for simplicity of illustration.

Figure 2 is a vertical section of Figure 1, taken upon the line 2—2 thereof, the spacing between the successive folds of the wrap being exaggerated and the stapling omitted in order to more clearly illustrate the folding of the packet.

Figure 3 is a top plan view of a partially wrapped packet, the matches having been threaded through spaced rows of perforations of the wrap and a short wrap turned down and stapled to place.

Figure 4 is a section of Figure 3 taken upon the line 4—4 but omitting the stapling, the view corresponding to the partially wrapped packet in the condition in which it is first presented to the mechanism embodying our present invention.

Figure 5 is a plan view of a blank wrap used in the packets shown in Figures 1 to 4.

Figure 9 is a fragmentary horizontal section taken upon the line 9—9 of Figure 8.

Figure 10 is an enlarged fragmentary vertical section taken upon the line 10—10 of Figure 8.

Figure 8:
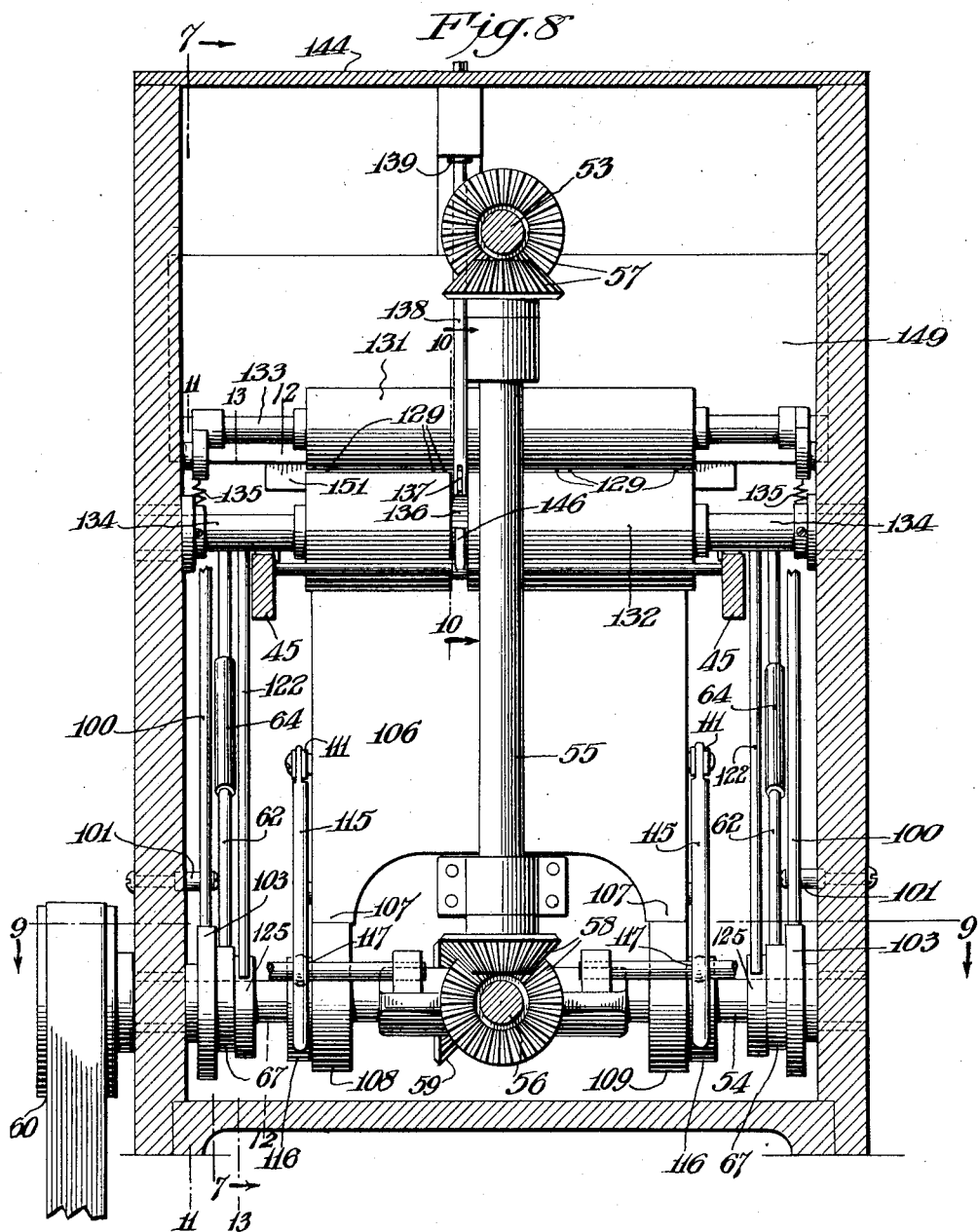
Figure 8 is a right end elevation of Figure 7 corresponding to a vertical section taken upon the line 8—8 of Figure 6 in the direction of the arrows.

Figures 11, 12 and 13 are side elevations of different operating details, respectively of the looper for turning the long flap around the packet, of a lower clincher die that receives the stapling stroke at the second stapler and of mechanism for positioning the gripper carriage, the views corresponding respectively to sections upon the lines 11—11, 12—12 and 13—13 of Figure 8, each view for the sake of simplification of illustration omitting parts shown in other figures.

Figure 14 is an enlarged scale top plan view of stapling structure.

Figure 15 is a vertical section taken upon the line 15—15 of Figure 14.

Figure 16 is a horizontal section taken upon the line 16—16 of Figure 15.

Figures 17 and 18 are fragmentary vertical sections taken upon the lines 17—17 and 18—18 respectively of Figure 15.

Figures 19, 20 and 21 are views corresponding to Figure 18 but with the parts in successively advanced positions, Figure 19 showing the parts at the end of the stapling stroke, Figure 20 showing the stapling plungers retracted and the stapling wire fed forward beneath the stapling plungers.

Figure 21 shows the plungers as having moved down cutting off and forming the wire into the next staple over a portion of the forming plunger, the forming stroke having been completed.

Figure 22 is a view corresponding to a portion of Figure 15 with the forming plunger in a different position, that corresponding to Figure 21.

Figure 7:
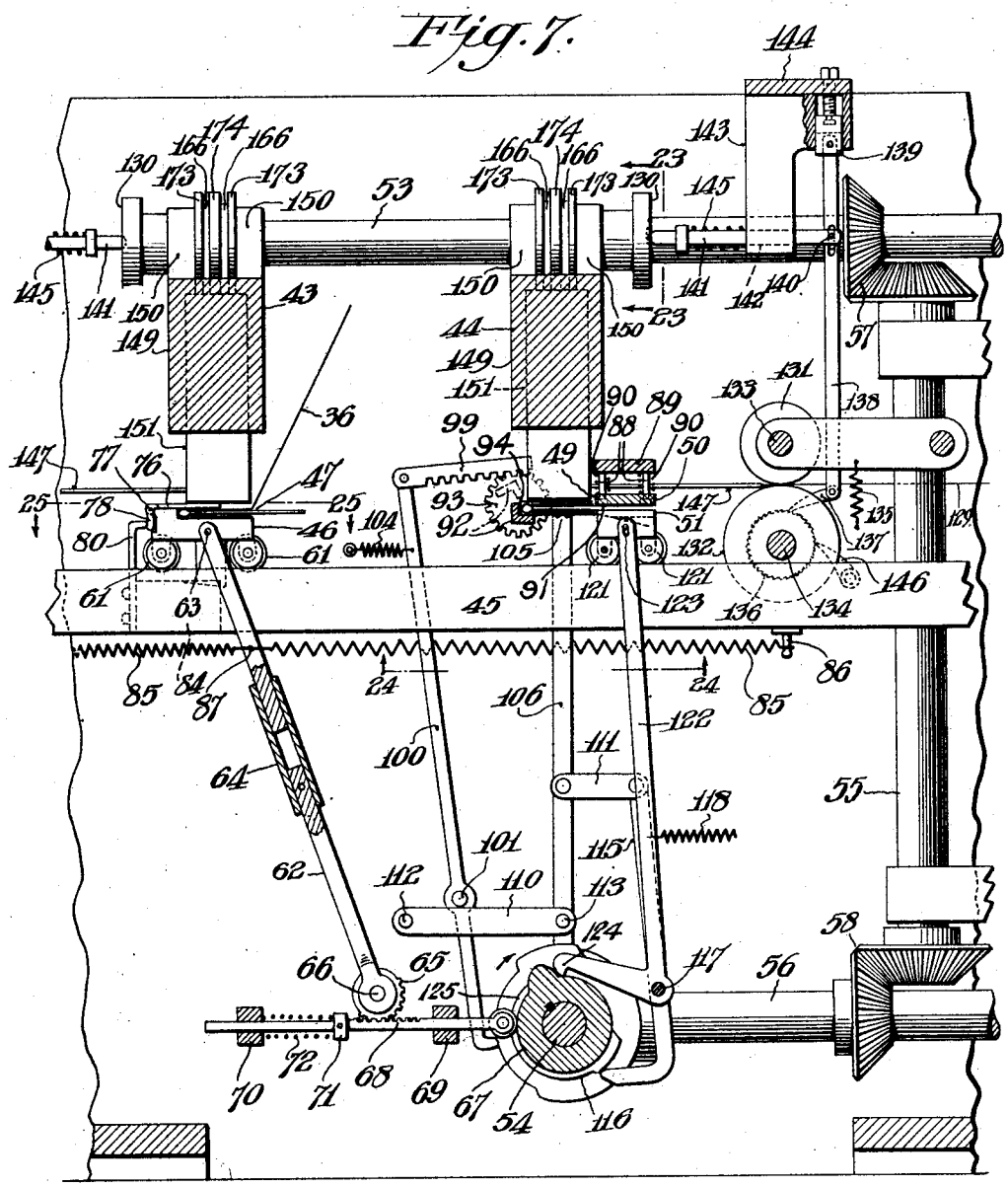
Figure 7 is a fragmentary vertical section taken upon the line 7—7 of Figure 6 or the line 7—7 of Figure 8.

Figure 23 is a detail vertical section taken upon the line 23—23 of Figure 7.

Figure 24 is a fragmentary horizontal section taken upon the line 24—24 of Figure 7 showing the looper mechanism at the bottom of the packet about to be stapled and mechanism holding the packet.

Figure 25 is a top plan view of the transfer carriage, showing without a packet, the view corresponding to a section upon the line 25—25 of Figure 7 but omitting the packet shown in Figure 7.

Figures 26 and 27 are vertical sections upon the lines 26—26 and 27—27 respectively of Figure 25 and respectively show one of the clincher dies that take the stapling strokes of the first stapler and one of the spring clamps that hold the packet to the transfer carriage.

Like numerals refer to like parts in all figures.

Describing in illustration and not in limitaton and referring to the drawings:—

Figures 1 and 2 illustrate one of the types of match packets that forms the final product of mechanism embodying our invention, while Figure 4 shows the condition of the pack when delivered to the machine.

The packet 30 may be of single or multiple section, the illustration showing a three-section packet that is adapted to be broken apart by the user or other person along division lines 31 between the packet sections.

A single wrap 32 (Figure 5) has spaced transverse rows of perforations 33 and 34 intermediate short and long flaps 35 and 36 respectively.

The perforations are turned up along the scored lines 37 and 38 perpendicular to the portion 39 of the wrap that is intermediate the rows of perforations and the matches 40 are threaded through the perforations as indicated in Figure 4, the short and long flaps usually extending upwardly during the threading operation.

The short flap 35 is then turned down upon the middle portion of the matches intermediate the rows of perforations to the position shown in full line in Figure 4, the partially wrapped packet shown in Figure 4 forming the work pieces or raw material intended to be fed to the mechanism of the present invention.

The structure embodying our present invention receives packets wrapped to the stage illustrated in Figure 4 and completes the wrapping and stapling operations, inserting the staples 41 as shown in Figure 3 to hold the short flap down upon the matches, then turning over the long flap down upon the short flap, around the projecting match heads and up upon the back of the packet as indicated in Figure 2, and then stapling each section at the edges as indicated at 42, Figure 1, the staples passing through the entire thickness of the packet.

Preferably the partially wrapped packets, wrapped to the stage of Figure 4, are delivered by machinery to mechanism embodying our invention but optionally they may be delivered by hand and we have therefore elected to illustrate our invention with mechanism for hand delivery of the partially wrapped packs.

Figure 6:
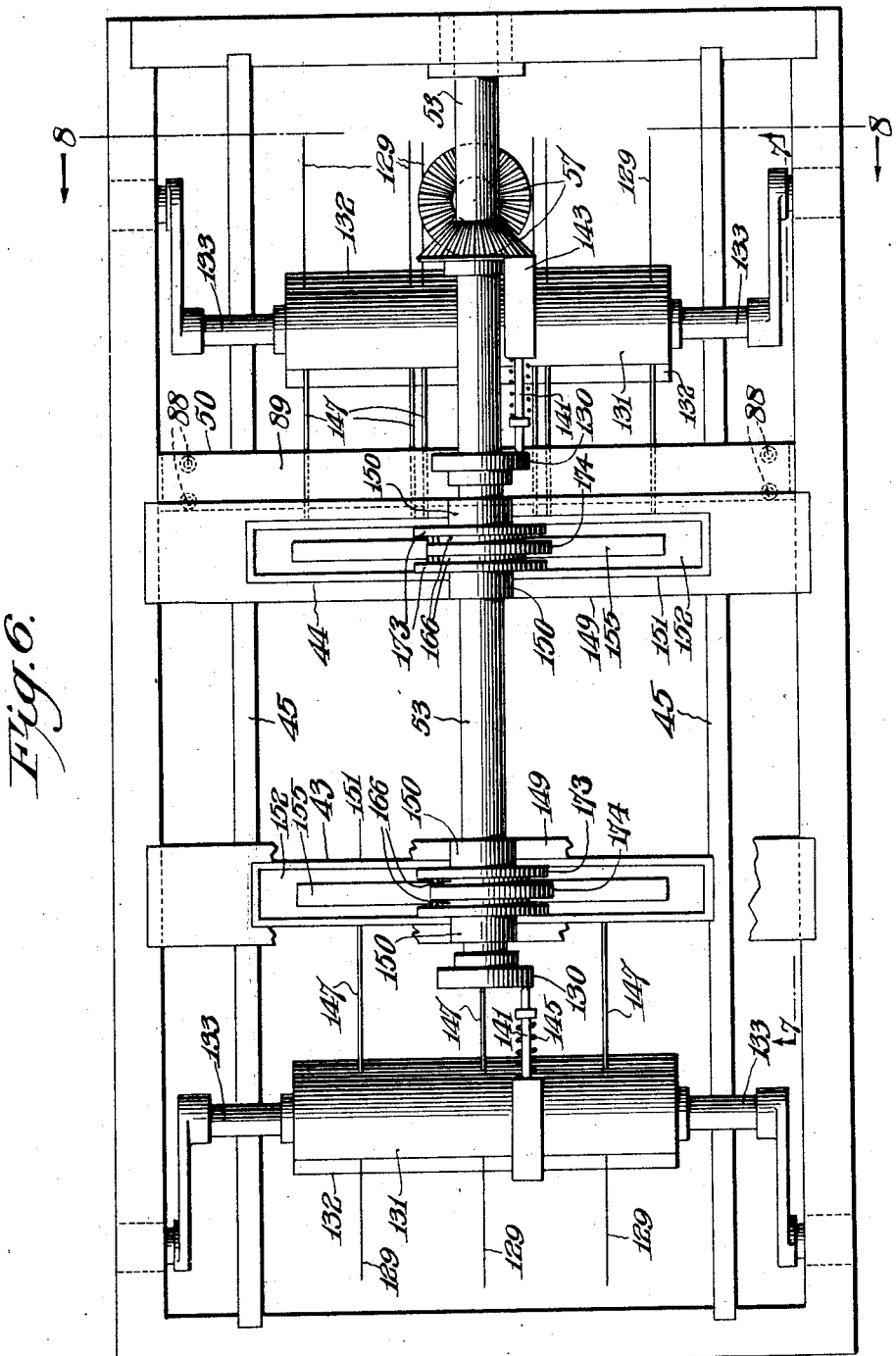
Figure 6 is a broken top plan view illustrating structure forming one embodiment of our invention, for simplicity of illustration omitting some of the parts shown in other figures.

As best seen in Figures 6 and 7 the mechanism includes spaced staplers 43 and 44 that are spaced above and extend transversely across a track 45.

A carriage 46 adapted to be moved along the track, receives the partially wrapped packet 47 at the first stapler which inserts the middle staples 41 (Figure 3), the carriage supporting the stroke of the stapler and presenting suitable clinching dies 48 (Figures 25 and 26) to the tines of the staples when they are forced through the packet.

The carriage 46 then moves over and delivers the packet to a gripper member 49 forcing the stick ends of the packet between upper and lower jaw members 50 and 51 of the gripper, which thus holds the packet by the projecting stick ends.

After the carriage 46 has delivered the packet to the gripper, it returns to its original position where it receives and cooperates in the stapling of another packet while the long flap 36 (Figure 4) of the first packet is being turned over and stapled at the edges of the individual sections.

Before the carriage returns with the second packet, the stapling operation at the second stapler has been completed and the gripper has discharged the finished first packet and returned to position for receiving the second packet.

The power layout shown includes with suitable supporting structure synchronously rotating shafts 53 and 54 and intermediate shafting 55 and 56, the shafting being suitably geared at 57, 58 and 59 to operate as a train and driven in any suitable way as by a belt to a pulley 60 on the shaft 54.

The shaft 53 operates the staplers 43 and 44 including roll mechanism feeding stapling wires to the staplers and the shaft 54 carries cams operating transfer mechanism as well as operating mechanism at the second stapler for holding the packet by the match stick ends, for folding or looping the long flap around the packet and for presenting a clincher die under the folded packet to receive the strokes of the stapler.

The mechanism at the first stapler includes the transfer carriage 46 and the stapler 43.

The transfer carriage may be of any desirable length and is shown with wheels 61 upon the spaced rails of the track 45.

The carriage 46 is operated back and forth along its track by end rocker members 62 which have horizontal axial pivot connection with the ends of the body of the carriage at 63 and have a longitudinal slip joint at 64 for longitudinal change of length incident to the straight line movement of the carriage 46 effected by angular movement of the rocker.

The lower ends of rocker arms 62 are rigidly fastened to coaxial pinions 65, that journal on relatively alined stud shafts 66 projecting from supporting structure of the machine.

The pinions 65 carrying the rocker arms 62 are operated by duplicate radial face cams 67 on the shaft 54, each meshing with the teeth of a rack rod 68 that is longitudinally guided at 69 and 70 and presenting its end against the cam 67.

The rack rod 68 carries a collar 71 and is spring pressed at 72 to its duty against the cam, which is formed to give the carriage the desired periods of movement and rest during each rotation of the shaft 54 (Figure 7).

The top of the carriage 46 (Figures 25, 26 and 27) is provided with a suitable corner gauge 73 for easy registry of the successive packets, an abutment 74 extending for the length of the carriage transversely to the track and a transversely adjustable abutment 73 at right angles to the abutment 74 providing a corner with the abutment 74 that is adapted to easy accommodation to different sizes of packet.

The packets are pushed to place with the match heads lining against the abutment 74 and the end of the packet against the other abutment, the second abutment being placed for registering the packets wtih respect to the stapler.

We mount spring plates 75 and 76 on top of the abutment 74 projecting some distance beyond the abutment to overlap the match packet, forming as it were a groove seat for the match head side of the packet.

Desirably the packet is spring clamped to the floor of the carriage during its transfer from the stapler 43 to the gripper 49 at the stapler 44 and we show the plates 75 and 76 as horizontally pivoted at 77 (Figure 27) to the carriage, as carrying a downwardly extending arm 78 at the back of the carriage and as spring-pressed at 79 toward a clamping position, at which position the projecting portions of the plates 75 and 76 will press down upon any packet upon the floor of the carriage.

When the carriage is in position under the stapler 43 the clamp should be in position of release and this is effected by an engagement of the downwardly projecting portion 78 of the rocker with a suitable stop 80 fastened to the supporting structure.

This engagement takes place when the carriage moves to place under the stapler 43, opening the clamp against the action of the spring 79 for easy entry of the next packet.

When the carriage travels to the right (Figure 7) away from the stationary member 80 the spring 79 closes the clamp, firmly holding the packet to definite position during its delivery to the gripper member 49.

The gripper member 49 takes hold of the projecting match stick ends with a considerably greater force than the clamp plates 75 and 76 so that when the carriage starts to retract from delivering a packet to the gripper 49, the clamp plates slide loose from the packet and partially close, to be adequately opened when the carriage reaches its end position under the stapler 43 by reason of the engagement between the members 78 and 80, and against the action of the spring 79.

Desirably the stationary clinching dies 48 that receive the force of the stapling strokes and clinch the tines of the staples at the first stapler project somewhat upwardly above the floor of the carriage during the stapling operation but should not project above the floor of the carriage while the packet is being pulled loose from the clamp plates 75 and 76 by the gripper 49.

We make the die members 48 comprise spaced T plates vertically movable in suitable slots 81 through the body of the carriage.

The T plates project below the body of the carriage at 82 and engage a suitable wedge surface 83 of stationary supporting structure 84 at the stapler 43, the dies being thus lifted to operating position as the carriage reaches its position under the first stapler and moving down out of the way as the carriage moves toward the gripper 49.

The structure 84 is shown as a rectangular bar extending between and supported by the spaced rails of the carriage track.

We preferably spring press the carriage 46 toward its mid-position so that it comes resiliently to rest at each end of its stroke and show at each end of the carriage a tension spring 85 which is anchored at its ends to stationary supporting structure as to the rails 45 at 86 and fastened at an intermediate point 87 to the rocker 62, the positioning of the points 86 being selected to give resilient equilibrium when the carriage is in its mid-position.

As the carriage approaches either end of its range of travel, the pull upon the carriage toward mid-position resiliently increases with the result that it comes quietly to rest at definite positions without lost motion.

The gripper member 49 that receives the stick ends of the packet and holds it for the "looping" or turn-over and for the final stapling operation includes upper and lower members 50 and 51, (Figures 6, 7, 12 and 24).

The upper member 50 comprises a horizontal flat plate adapted to vertically slide upon downwardly directed stationary pins 88 carried by a transverse plate 89 of the supporting structure at opposite sides of the track.

The plate 50 comprising the upper jaw member is spring-pressed downwardly by springs 90 surrounding the pins and is suitably chamferred at 91 along the forward bottom edge of the plate for easy entry of the match stick ends between the plates.

When the packet is carried to the right by the carriage 46, the face of the abutment 74 (Figure 26) is engaging the head ends of all of the matches, and pushes the packet so that the match stick ends force their way between the chamferred edges of the upper and lower jaw members 50 and 51, with a requisite upward yielding of the upper jaw against the springs 90, all of the match stick ends being then firmly gripped between the upper and lower jaw members.

After delivering the packet to the gripper 49, the carriage retracts, leaving the packet held by the match stick ends, the clamp members 75 and 76 carried by the carriage, having a hold less strong than the gripper 49, sliding off the match head end of the packet as the carriage starts back.

As the transfer carriage 46 starts toward the second stapler the long flap 36 of the packet is projecting upwardly about as indicated in Figure 7 but is bent forward by passing under a member 92, technically called a looper, and which is at this time in a raised position shown in dot-and-dash lines in Figure 7, the looper being shown in full lines in its depressed position.

The looper is thus at first in effect a low bridge which in the dot-and-dash position of Figure 7 sweeps the long flap 36 rearward as the transfer carriage delivers the packet to the gripper member 49 and after the carriage retracts and the looper has moved to the position shown in full lines in Figure 7, the long flap of the packet is about in the position indicated in dot-and-dash, Figures 7 and 12.

The looper 92 comprises a horizontal angle member that is adapted to extend along and fit the match head end of the packet as indicated in full-line, Figure 7, the angle member being carried between pinions 93 that have a common horizontal pivotal axis preferably at the upper corner 94 of the finished packet when the packet is under the second stapler.

After retraction of the transfer carriage, the looper is swung angularly on its pivot from the position shown in dot-and-dash, Figures 7, 11 and 12 to that shown full lines, the long flap being turned downward around the head ends of the matches and then upwardly against the bottom of the packet, the outer portion of the long flap engaging the bottom of a thin intermediate portion of the plate 51 of the gripper.

The looper construction is best seen in Figures 7, 9, 11, 12 and 24. The pinions 93 have alined journal support 96 in the side plates 97 and 98 of the supporting structure and are angularly reciprocated in suitable timed relationship to the delivery of the packet to the gripper member by similar rack links 99 carried at the upper ends of similar rocker members 100.

The rocker members 100 are pivoted at 101 on the stationary supporting structure and present toes 102 to similar cams 103 upon the cam shaft 54, being spring-pulled at 104 to maintain contact with the cam.

After the long flap has been folded down around the head end of the packet and up against the bottom of the packet a clincher die 105 moves to place under the packet to receive the stapling stroke.

All of the staples at the second stapler are put in simultaneously, two staples at opposite sides of each packet section, the force of the stapling stroke being supported upon the upper end of the preferably vertical plate member 106, the clincher dies 105 being presented by the top of the plate 106.

The plate member 106 is positioned under the packet after the packet has been delivered to the gripper mechanism 49 and after the operation of the "looping" or long flap turnover, the plate member then presenting suitable clinching dies 105 to receive and clinch the descending tines of the different staples.

The top of the plate 106 must be out of the way of the long flap 36 during the operation of the turn-over or "looping" mechanism, the clinching dies 105 pressing upwardly against the turned over long flap during the final stapling, and being out of the way until the long flap is in position for the final stapling.

After the long flap has been turned to position for stapling the plate 106 swings over from the right, from the dot-and-dash position of Figure 12 to a position spaced vertically beneath the stapling plungers, and then rises vertically into the bottom of the packet in time to receive and support the stapling stroke.

The plate 106 has downward projections 107 resting upon suitably spaced radial cams 108 and 109 on the cam shaft 54, the cams 108 and 109 being exactly alike.

The plate 106, as best seen in Figure 12, is angularly positioned at each end by vertically spaced links 110 and 111, the links 110 having fixed pivot connections 112 to stationary supporting structure and pivot connections 113 to the plate near the lower end thereof, and the links 111 extending between an intermediate point 114 of the plate and the upper end of a rocker member 115 that is angularly positioned by a suitable radial cam 116 upon the cam shaft 54.

It will be understood that the linkage and cams for angularly and vertically positioning the plate 106 are the same at both ends of the plate, and as shown for one end in Figure 12.

The rocker member 115 is pivoted at 117 and spring-pulled at 118 into continuous engagement with the cam 116.

The cams 108 and 116 and the like 110 and 111 cooperate to give the plate the desired vertical and angular positions at the different periods of the cycle of operations, the dimensions of the cams and other parts being such as to swing the plate downwardly and to the right out of the way of the turn-over operation and then back to the left and upwardly into position to take the stroke of the stapler upon the clinching dies 105.

After the match packet has been delivered to the second stapler and the transfer carriage 46 retracted to the first stapler, the looper member 93 rotates from the positions shown dot-and-dash to that shown in full lines (Figures 7, 11 and 12).

The pivotal axis of the pinions 93 and therefore of the looper preferably coincides with the upper corner of the packet when the packet is in looping position so that the angle portion of the looper forms the match-head end of the packet at the scored lines 119 and 120 of the card (Figure 5).

The patch of the long flap is indicated by the dot-and-dash line of Figure 12.

The plate 106 moves to place after completion of the looping operation, after which the lower jaw member 51 of the gripper moves away to the right (Figures 7 and 13) while the packet is momentarily held between the upper and lower stapling dies, as described later, the jaw member 51 pulling free from the firmly held packet so that when the stapling dies loosen the finished packet may fall out of the way.

As illustrated, the member 51 is somewhat similar to the transfer carriage 46 being supported by suitable wheels 121 upon the track 45 and positioned longitudinally along the track for a short distance by suitable rocker members 122 as best seen in Figures 7 and 13.

The rocker members 122 have alined pivots upon the shaft 117, have alined slot and pivot connections at 123 with the member 51 and each presents a toe 124 to a radial cam 125 upon the cam shaft 54.

The rockers are spring-pressed at 126 to maintain contact with the cam and the dimensions of the cam and rocker are selected to give the desired movement to the member 51 which is the lower jaw member of the gripper 49, moving the member 51 to the right for packet delivery after the stapling stroke has been completed and before the retraction of the stapling plungers and subsequently returning it to position to receive the next packet from the transfer carriage 46.

Important features of my invention are directed to the stapling mechanism which permits the easy stapling simultaneously of any desired number of sections of match packets, three sections being shown in the illustrations.

The two staplers 43 and 44 are shown alike except with respect to the location and number of sets of stapling units and for this reason it will be necessary to describe in detail one only of the staplers.

We select the second stapler for description because it includes a greater number of sets of stapling units than the first and for this reason has somewhat closer clearances than the first stapler, the first stapler inserting simultaneously three staples and the second stapler six staples at each downward stroke.

The wire supplies for the different stapling sets are desirably from suitable spools 128 (Figure 10).

While obviously the wire 129 for each staple unit of the stapler may have a separate feed, all of the feeds however being effected by a single feed cam 130 we have preferred to illustrate all of the wires fed through different portions of a common pair of rolls 131 and 132 which may be loosely mounted upon shafts 133 and 134 respectively (Figures 6, 7 and 10).

The upper roll 131 is spring pressed at 135 against the lower roll 132 which turns on the fixed shaft 134 and carries a ratchet wheel 136 that is rotated by a pawl member 137 pivoted upon the lower end of a link 138.

The link 138 has vertically adjustable pivot support at its top at 139, Figure 7, and a slot and pin pivot connection at 140 with a horizontal rod 141 that is longitudinally reciprocated by the face cam 130, Figures 7 and 23, on the cam shaft 53.

The rod 141 is mounted in a horizontal guide 142 carried by a bracket 143 that also provides guiding support for the vertically adjustable pivot support 139 at the upper end of the link 138.

The bracket 143 is fastened to the supporting structure in any suitable way being illustrated as fastened to the lower side of a transverse plate 144 that extends between the front and back plates of the machine.

The horizontal rod 141 is spring pressed at 145 to contact with the face cam 130.

The feed of the wire is adjustable by changing the height of the pivot 139, which changes the throw of the pawl 137 without affecting the movement of the operating rod 141.

A suitable auxiliary pawl 146, Figures 7 and 10, is shown for preventing return of the ratchet 136 during return strokes of the operating pawl 137.

Each rotation of the cam shaft 53 longitudinally reciprocates the rod 141 to forwardly feed the roll 132, thereby forwardly feeding the six wires 129 compressed between the rolls.

The wires 129 are desirably guided to the different stapler units through suitable metal tubing 147.

The staplers are supported in any suitable way from stationary supporting structure as by transverse brackets 149 vertically recessed to receive the body of the stapler and themselves supported between the opposite side plates 97 and 98 of the machine.

The brackets 149 may carry suitable bearings 150 for the cam shaft 53.

As best seen in Figures 14 to 16 and 22 the stapler includes an outside housing member 151, a vertical plunger 152 carrying the six sets of blades 153 and 154 for forming and guiding the staples, a vertical plunger 155 carrying six blades 156 for driving the staples home and a horizontal plunger 157 used first as a forming die and then as a guiding housing for the blades 153 and 154 during the lower portion of the stapling strokes.

We show the main housing member 151 of the stapler as comprising a single piece but for manufacturing purposes this member may desirably comprise any desired number of pieces held together by suitable screws.

The main housing member 151 is vertically recessed to receive and vertically guide the outside plunger 152 and at the bottom of the recess is provided with a transversely extending bridge 158 that connects the opposite walls of the housing together and is provided with transverse slots 159 that fit and guide the different sets of stapling blades (see Figures 15, 17 and 18).

The housing 151 is horizontally recessed below the bridge portion 158 to provide a guiding seat 157' for the horizontal plunger 157.

The horizontal plunger 157 has an upper portion 160 for use as a die over which the staples are formed, a portion 161 being adapted to give support to the upper portion 160 and to guide the stapling blades during the latter portion of their strokes.

The horizontal plunger 157 is slotted at 162 for the full width of the sets of stapling blades 153, 156 and 154, which pass through and are guided by these slots during the lower portion of the stapling stroke.

During the earlier portion of each stapling stroke, the member 157 is stationary with the slots 162 longitudinally offset or out of registry with the ends of the stapling blades 153, 156 and 154, the blades 153 and 154 at this time bending the wire into a staple over the die portion 160.

After the staples have been formed the horizontal plunger is moved so that its slots register with the stapling blades, which then move down through the slots to complete the stapling stroke.

The wire 129 Figures 6, 7, 10 and 14 to 21 is fed inwardly under the raised blades across the combined width of the three blades (Figure 20).

The plungers 152 and 155 carrying the six sets of three stapling blades then begin to descend, the middle plunger 155 moving downward merely a distance sufficient to clamp the wire upon the top of the forming plunger and then coming to rest, as in Figure 10.

The outer plunger carrying the outside blades 153 and 154 continues to move downwardly, the blades 153 first shearing the wire 129 at 164 and then bending it down over the upper portion of the die plunger to form the staple, the position of the plungers now being as shown in Figure 21.

After the staple has been formed the blades 153 and 154 again come to rest by reason of the plunger 152 coming to rest, the horizontal die plunger 157 then shifts longitudinally to bring its slots 162 into registry with the stapling blades after which the three blades move down together due to a suitable downward movement of both plungers 152 and 155, the blades 153 and 154 preferably coming finally to rest when lightly clamping the top of the packet while the middle blade continues on downward and drives the staple home, the tines of the staple clinching in the stationary die 105 that is at this time registering with the descending staples.

The outer blades 153 and 154 have a thickness suitably greater than that of the wire from which the staples are formed and are desirably grooves at 165, Figures 19 to 21, to provide a longitudinal seat for the tine portions of the staples.

The horizontal die plunger 157 has a guiding support in the bottom portion of the housing member 151, and is longitudinally positioned by cams 166 upon the shaft 53, vertical plates 167 being mounted upon opposite sides of the die portion 160 of the member 157.

The plates 167, fastened at 168 to the plunger 157, Figure 15, extend upwardly between the inner plunger 155 and the outside plunger 152 through suitable recesses shown as cut partly in the plunger 155 and partly in the plunger 152.

The die plunger 157 is spring pressed at 169 to maintain the member in continuous engagement at 170 with the cams 166 which are formed to give the desired positions to the plunger.

The plungers 152 and 155 are strongly spring pressed upwardly by pairs of springs 171 and 172 into continuous contact with cams 173 and 174 on the cam shaft 53 (Figures 15 and 16), the cams being formed to give the desired movements and rest periods to the different parts.

The cycle of stapling operations is best indicated in Figures 18 to 21 inclusive, Figures 17 and 18 showing the stapling blades in the same position as Figure 15 which is that in which the staples have been formed over the forming die 160, have come to rest and the forming die moved longitudinally to bring the slots 162 under the stapling blades, the cams 174 and 173 being about to start the final downward movement of the stapling blades 155 and 152 that effect the stapling.

In Figure 19 the stapling blades have just completed their downward stroke, being ready to start to rise, the cams having advanced until the dot-and-dash line 175 on Figure 15 is directed vertically down.

Continuing to advance from the point 175 the plungers 152 and 155 move upwardly until when the point 176 is down the stapling blades are all the way up as indicated in Figure 20, remaining all the way up between the points 176 and 177, at which point the cam 174 has a small increase in diameter which moves the central plunger downwardly to grip the wire 129 (Figure 10).

The wire is fed through a suitable guide tube 147 to place beneath the stapling blades and the die plunger 157 is shifted between the points 176 and 177 (see Figure 23).

Between the points 178 and 179 the central plunger is stationary while the plunger 152 and blades 153 and 154 are moving downwardly to cut off the wire and form it into a staple over the die member 160, Figure 21 showing the positions of the different parts at the point 179.

At the point 179 the forming stroke is completed the stapling blades having the position indicated in Figure 21 after which the horizontal die plunger 157 moves to the left at any convenient time between the points 179 and 180 bringing the parts to the position shown in Figures 15, 17 and 18 with the slots 162 in registry with the stapling blades, and the stapling blades being ready to move down to the final stapling position shown in Figure 19.

In view of our invention and disclosure variations and modifications to meet individual whim or particular need will doubtless become evident to others skilled in the art, to obtain all or part of the benefits of our invention without copying the structure shown, and we, therefore, claim all such in so far as they fall within the reasonable spirit and scope of our invention.

Having thus described my invention, what we claim as new and desire to secure by Letters Patent is:

1. In match packeting mechanism, a multiple stapler including an inside plunger, downwardly extending blades thereon spaced along the bottom thereof, an outside plunger encasing the sides of the inside plunger, downwardly extending blades on the outside plunger one on each side of each inside blade and in the plane thereof, supporting structure encasing the outer sides of the outside plunger and presenting a bridge portion downwardly spaced from both plungers and perforated to downwardly pass the blades, springs between the bridge and plungers resiliently pressing the plungers upwardly, and a die plunger in the supporting structure having a range of movement across that of the blades and cam means for positioning the blades, the die plunger being adapted to cooperate at an early portion of the stroke with the sets of outside blades to form the staples and for movement after the forming operation is completed to permit passage of the blades, the plungers moving down after the staples have been formed to complete the stapling stroke.

2. In packeting mechanism for completing the packeting after the matches have been inserted and the short flap turned down, a stapler, a transfer carriage having receiving position below the stapler, a vertically movable die carried upon the carriage for receiving the stapling strokes, and wedge means for presenting the die in raised position when the carriage is under the stapler.

3. In match packeting mechanism for completing the packeting after the matches have been inserted through the wrap, a stapler for fastening down a short flap, a transfer carriage having a receiving position under the stapler, a clamp pivotally mounted at a rearward upward corner of the carriage and having horizontal and vertical arms respectively presented over the received packet and at the rearward side of the carriage, a spring mounted in the carriage pressing the rearward arm outwardly to effect clamping, and a stationary stop deflecting the downward extending arm forwardly against the spring when the carriage is in its receiving position.

4. A short flap stapling mechanism, a packet carriage adapted to receive a partially folded match packet and to present it to the short flap stapling mechanism, other mechanism adapted to turn over the long flap and to staple the long flap, in combination with means for transferring the packet from the carriage to the said second mechanism.

5. In match packeting mechanism, a looper, a stapler, a gripper adapted to hold a partially wrapped match packet of the character indicated by the match stick ends in position for looping and stapling and a staple receiving die, in combination with mechanism for successively operating the gripper, the looper and the stapler and receiving die, presenting the receiving die under the stapler during the stapling stroke and removing it thereafter for a release of the operation of the gripper.

6. In a stapling machine, spaced staplers, a transfer carriage adapted to receive a partially wrapped match packet and to present it to the first stapler for stapling the short flap of the packet, a gripper at the second stapler, a looper at the second stapler, the stapler being intermediate the looper and gripper, mechanism adapting the transfer carrier to deliver the match packet to the gripper so that its match stick ends are gripped and the packet toward the head end thereof is presented under the second stapler and in position for looping, means for operating the looper, and a clinching die adapter to receive the stroke of the second stapler.

7. In match packeting mechanism, spaced staplers for respectively stapling the short and long flaps of successive match packets, means for presenting the packets successively to the staplers, a shaft across the top of the staplers, and cams on the shaft operating both staplers with each revolution of the shaft.

8. In match packeting mechanism, spaced staplers for respectively stapling the short and long flaps of successive match packets, means for presenting the packets successively to the stapler, a shaft across the top of the staplers and cams on the shaft operating both staplers with each revolution of the shaft, each stapler including outside and inside plungers, sets of outside and inside blades thereon, and a die plunger for forming the staples from wire fed to the stapler, and the cams at each stapler including a cam for each plunger thereof, the die plunger having operative connection with its cam between the inside and outside plungers.

9. In mechanism for match packeting, spaced staplers respectively for fastening the short and long flaps in position, and a transfer carriage for shifting the packets from one stapler to another.

10. In a match making machine, a transfer carriage having receiving and delivery positions, mechanism at the receiving position of the transfer carriage adapted to fasten the short flap down while the packet is upon the carriage, mechanism for moving the carriage to its delivery position, a gripper having upper and lower jaws, the upper jaw yielding resiliently upward to receive and clamp the match stick ends of the packet when the carriage reaches its delivery position, a looper operative after the return of the carriage to its receiving position to effect looping whereby the long flap is turned down around the match heads and up against the bottom of the packet, a stapler in position near the gripper above the gripped packet adapted to staple the long flap, a receiving die for receiving the stapling stroke while the packet is held by the match stick ends, means for moving the die to position after the operation of the looper, means for moving the lower jaw member of the gripper longitudinally away along the match stick ends while the stapler is at the end of its stapling stroke and the packet clamped between the die and stapler and means for moving the die downwardly and rearwardly out of the way when the stapling stroke retracts, permitting the packet to discharge by gravity.

RODNEY S. PULLEN.
WILLIAM J. CROWELL, Jr.

CERTIFICATE OF CORRECTION.

Patent No. 1,884,215.                                              October 25, 1932.

RODNEY S. PULLEN, ET AL.

It is hereby certified that error appears in the printed specification of the above numbered patent requiring correction as follows: Page 5, line 26, for "like" read "links"; and line 39, for the numeral "93" read "92"; page 8, line 23, claim 6, for "carrier" read "carriage", and lines 28 and 29, for "adapter" read "adapted"; and that the said Letters Patent should be read with these corrections therein that the same may conform to the record of the case in the Patent Office.

Signed and sealed this 21st day of February, A. D. 1933.

(Seal)

M. J. Moore,
Acting Commissioner of Patents.